(12) United States Patent  
Beal

(10) Patent No.: US 8,719,087 B2  
(45) Date of Patent: *May 6, 2014

(54) CONSOLIDATED CONSUMER REWARDS SYSTEMS AND METHODS

(76) Inventor: Bryan Beal, Mount Vernon, OH (US)

(*) Notice: Subject to any disclaimer, the term of this patent is extended or adjusted under 35 U.S.C. 154(b) by 1146 days.

This patent is subject to a terminal disclaimer.

(21) Appl. No.: 12/248,401

(22) Filed: Oct. 9, 2008

(65) Prior Publication Data

US 2010/0094690 A1 Apr. 15, 2010

(51) Int. Cl.
*G06Q 30/00* (2012.01)
*G06Q 90/00* (2006.01)

(52) U.S. Cl.
USPC ............................................. 705/14.3

(58) Field of Classification Search
USPC ............................................. 705/14
See application file for complete search history.

(56) References Cited

U.S. PATENT DOCUMENTS

| | | | |
|---|---|---|---|
| 6,061,660 A | 5/2000 | Eggleston et al. |
| 6,129,274 A | 10/2000 | Suzuki |
| 6,889,198 B2 | 5/2005 | Kawan |
| 7,085,731 B1 | 8/2006 | Powell et al. |
| 2002/0082920 A1 | 6/2002 | Austin et al. |
| 2003/0236704 A1 | 12/2003 | Antonucci |
| 2004/0054581 A1 | 3/2004 | Redford et al. |
| 2004/0054587 A1 | 3/2004 | Dev et al. |
| 2006/0224454 A1 | 10/2006 | Kantor et al. |
| 2007/0038515 A1 | 2/2007 | Postrel |
| 2007/0198352 A1 | 8/2007 | Kannegiesser |

*Primary Examiner* — Saba Dagnew
(74) *Attorney, Agent, or Firm* — Black, McCuskey, Souers & Arbaugh, LPA

(57) ABSTRACT

A consumer tracking and rewards system and related methods that provide for consolidating two or more merchant-branded rewards accounts into a single source. A single unique identifier referred to as a consumer number used to track and credit purchases with respect to multiple retail establishments. The consumer number may exist simply as a data element in the system or may be printed, bar coded, or programmed onto any physical medium or device. Components of the system include a consumer rewards platform, a merchant-consumer rewards system and potentially a card vendor system. The consumer rewards platform facilitates communication and the transfer of data between the various components of the system. A cross-reference between single consumer numbers and one or more merchant rewards program numbers is used to accommodate the trading and linking of information among participating merchants. Consumers may communicate with the various system components through a consumer web portal. A website is also available to merchants so they may view statistical information regarding rewards program participation.

24 Claims, 9 Drawing Sheets

CONSOLIDATED CONSUMER REWARDS SYSTEMS AND METHODS

RELATED APPLICATIONS

There are no pending applications related to this application.

FIELD OF THE INVENTION

The present disclosure relates, generally, to consumer rewards, loyalty and membership programs, and more particularly, to a consumer tracking and rewards system and method of updating, managing, and storing records of consumer information, including demographic data and purchases with multiple merchants and establishments.

BACKGROUND OF THE INVENTION

Consumer rewards, loyalty and membership programs are programs sponsored by merchants, services, corporations or clubs as marketing programs that provide consumers with incentives for repeat business, for example to continue purchasing from a particular merchant by providing the consumer with a number of reward or loyalty points based on the number of dollars spent with the merchant. The points may be redeemed by the consumer for cash, merchandise, coupons, or discounts once the consumer has reached a certain point threshold. These programs are typically implemented by merchants asking consumers to complete a paper or online application at the point of sale or elsewhere and thereby issuing the consumer a merchant-branded rewards card which the consumer must present with payment at the time of each purchase with the retailer in order to obtain reward points for their purchases. Under this current system there are inefficiencies for both consumer and merchant.

The first issue affecting the consumer is that in order to enroll in a merchant rewards program, the consumer must complete an application, usually in paper form, and usually at the point of sale. Many consumers may consider this a hassle and may choose not to participate. Other consumers may also view this as an unnecessary step in the point of sale process causing a delay in each consumer's transaction time.

Another problem affecting the consumer is that consumers, who choose to enroll in a multitude of merchant rewards programs, are expected to carry a separate card for each merchant or rewards program for which the consumer is enrolled. If the consumer does not have the rewards card at the time of a purchase, the consumer may not receive the point rewards for the purchase and the merchant misses an opportunity to gain valuable demographic and consumer spending data.

Merchants also encounter difficulties under the current system. The current system can be very expensive to implement, thus eliminating the option for smaller merchants to offer a rewards program. Larger merchants may not see as much return on investment because the process is so cumbersome for consumers to join and participate. Much of the merchant benefit is lost if consumers are not likely to enroll or to carry and use the rewards card. The terms "rewards", "loyalty" and "membership" are used synonymously herein, and include and mean any program or plan whereby a consumer of goods or services is acknowledged or rewarded or recognized for his or her purchases from a business such as a retailer or service provider. For example, a consolidated consumer rewards system may include any program which enables, acknowledges, rewards (monetarily or otherwise) or tracks the purchases of any consumer of any goods or services. As used herein, the term "merchant" refers to any provider or seller of any goods or services, whether retail, wholesale or business-to-business. As used herein, the term "consumer" means any purchaser of goods or services, whether any individual or business entity, or for personal or commercial use.

A problem affecting both merchants and consumers is that consumers rarely update their addresses with merchants. If a consumer moves to a new address they may not receive the coupons, catalogs, and other incentives that are often mailed to the consumer to encourage them to visit the merchant. Merchants therefore spend money mailing these coupons and catalogs to the wrong people and consumers do not see the benefits they were promised.

SUMMARY OF THE INVENTION

The invention provides a consolidated consumer rewards system for the administration of multiple consumer rewards programs of multiple merchants In accordance with one aspect of the disclosure and invention, there is provided a consumer rewards platform that is configured and programmed to maintain multiple consumer numbers which are used to enroll multiple consumers in multiple consumer rewards programs and account for all purchasing activity which affects any of the multiple consumer rewards programs. The consumer rewards platform is operatively connected to multiple merchant-consumer rewards platforms that have content which defines criteria for enrolling and rewarding consumers for purchases and maintaining records of consumer purchasing and awards activity. A unique consumer number is assigned to each consumer for enrollment in the consumer rewards system and is used by the consolidated consumer rewards platform to track all enrollment and purchasing activity for processing by the consolidated consumer rewards system. Within the consolidated consumer rewards system, multiple consumers may enroll in multiple consumer rewards programs and receive rewards from each of the consumer rewards program of each of the multiple merchants by transfer of information on consumer activity from the multiple merchant consumer rewards platforms to the consolidated consumer rewards platform.

The present disclosure and related inventions overcome the disadvantages of current rewards, loyalty and membership systems, and provides a vastly improved system to the benefit of both merchants and consumers. It allows users the opportunity to quickly enroll in one or more merchant-consumer rewards programs without the need to carry a multitude of consumer-branded rewards cards. It also helps the merchant by providing improved demographic information and a less expensive method for implementing a merchant-consumer rewards system.

DETAILED DESCRIPTION OF PREFERRED AND ALTERNATE EMBODIMENTS

Figure 1:
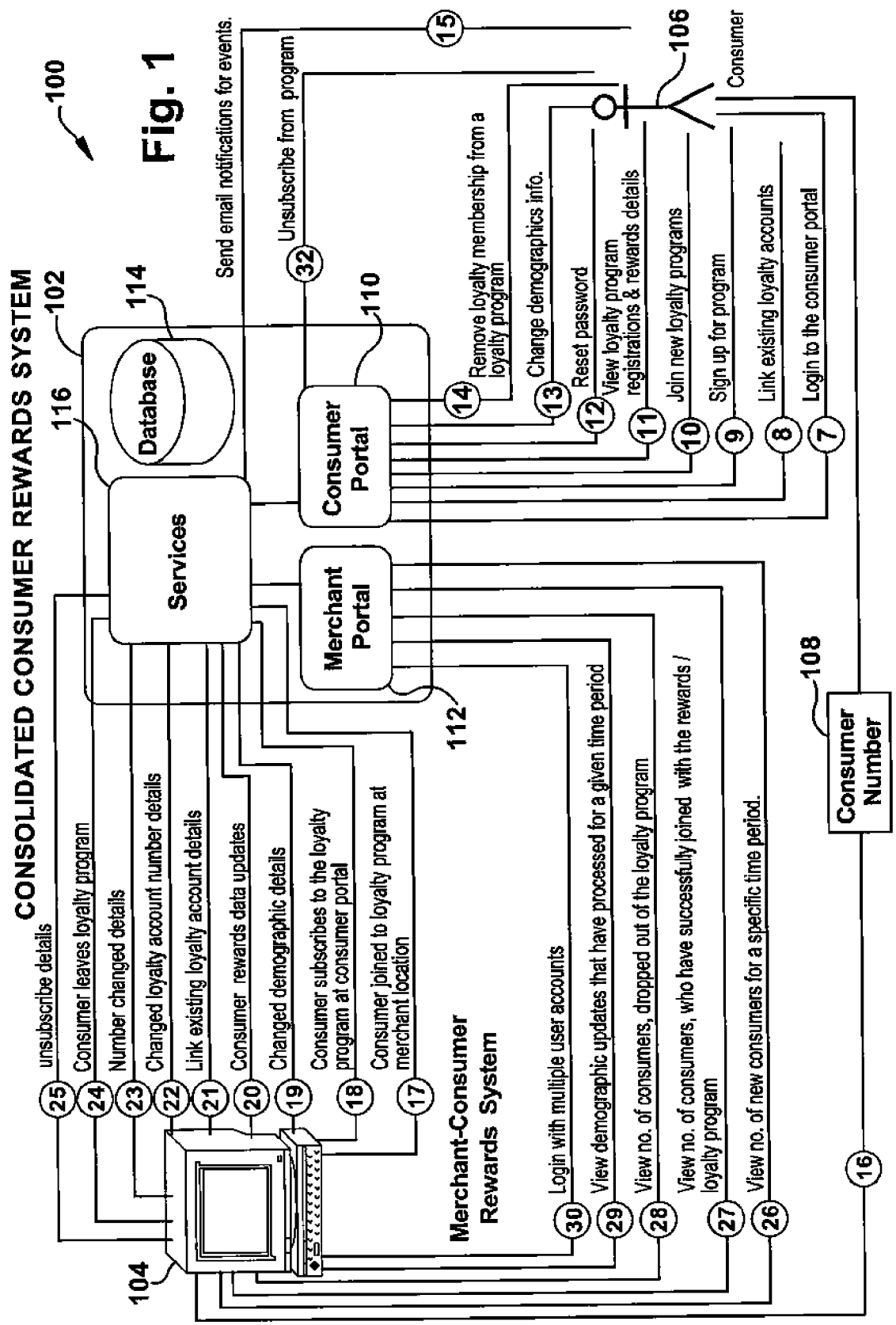
FIG. 1 is a schematic diagram of one embodiment of a consolidated consumer rewards system containing a consumer rewards platform component and a merchant-consumer rewards system component.

FIG. 1 illustrates a system 100 (hereinafter referred to as "consolidated consumer rewards system 100") representing the present disclosure and related inventions to implement the disclosure. In this embodiment, a single, unique consumer identifier or consumer number 108 (hereinafter referred to as "consumer number 108") is used to track and credit purchases of a consumer 106 with respect to multiple retail establishments, membership organizations, employers, government institutions, financial institutions, airlines, hotels, colleges and universities, or any other business entity (hereinafter referred to alternatively or collectively as "merchants"). The consumer number 108 may be any unique numeric, alphabetic or alphanumeric series of any length. The consumer number 108 may exist simply as a data element in the system 100 or may be printed, bar coded, or programmed onto any physical medium or device, as schematically represented in FIG. 1. Examples of various kinds of media which can be used to carry the consumer number 108 for an individual consumer include, but are not limited to, a magnetic strip, any type of digital storage device, a SmartCard, a edit or debit card, bar code, or radio frequency identification (RFID) tag. The consolidated consumer rewards system 100 has two main components: the consumer rewards platform 102, that contains, among other things, consumer rewards services 116, a consumer rewards database 114, a merchant portal 112, a consumer portal 110; and merchant-consumer rewards system 104. While only a single merchant-consumer rewards system 104 is shown in FIG. 1, it is understood that the consolidated consumer rewards system 100 is configured and designed to accommodate multiple merchant-consumer rewards systems for multiple merchants, as further described. It should also be noted that the merchant-consumer rewards system 104 as described herein refers to a combination of merchant rewards services and merchant point of sales (POS) systems. The term 'platform' is used herein to describe an operating environment, under which various smaller application programs can be designed to run. The term 'system' as used herein refers to a working combination of hardware, software and data communications devices which are configured and programmed with the described features to perform the described functions.

Figure 2:
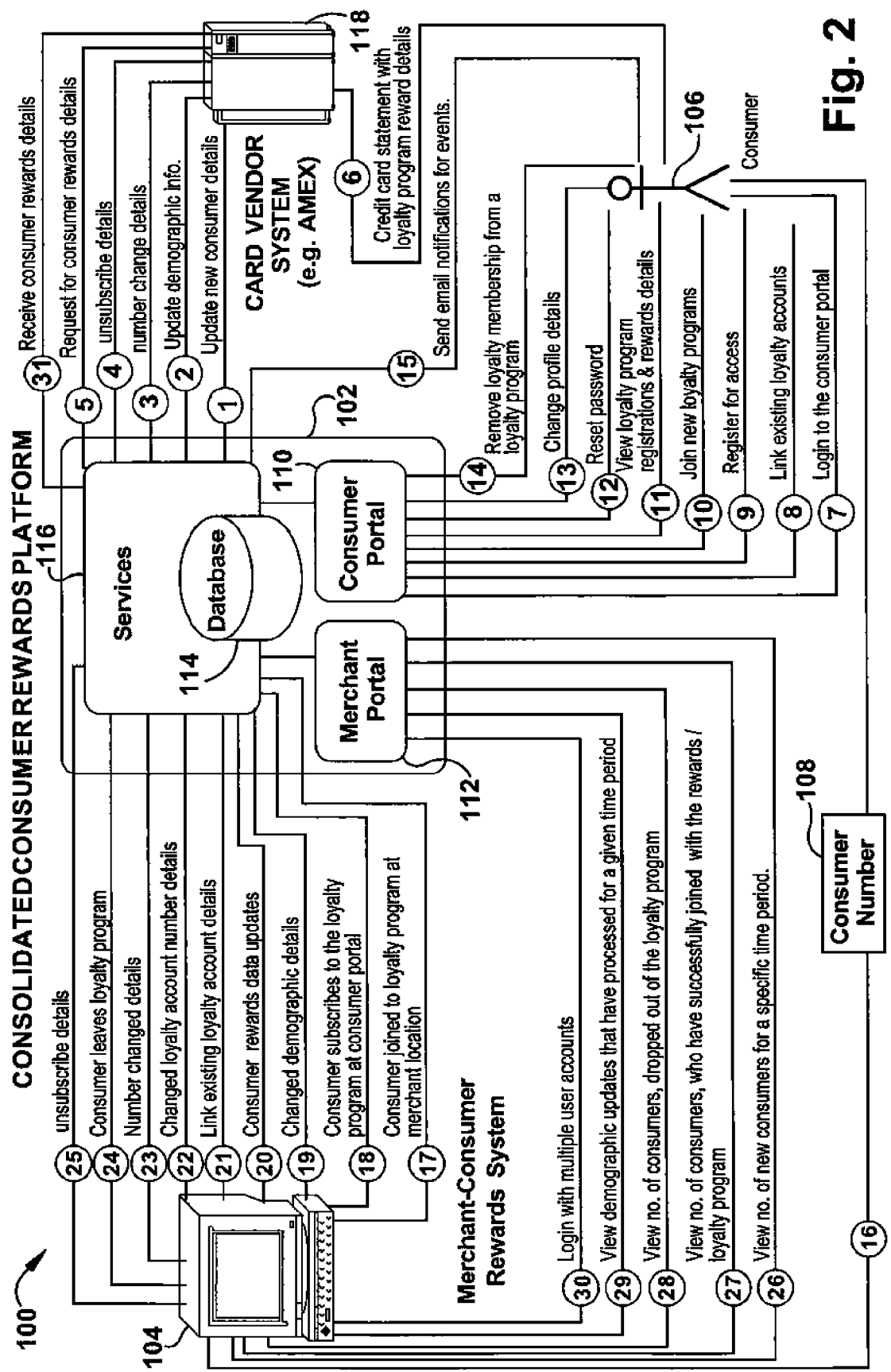
FIG. 2 is a schematic diagram of a second embodiment of a consolidated consumer rewards system containing a consumer rewards platform component, a merchant-consumer rewards system component, and a card vendor component.

In an alternate embodiment of the present disclosure, illustrated in FIG. 2, the consumer number 108 is integrated with a card vendor system 118. A card vendor may be any payment, credit, debit or electronic finds transfer transaction facilitator. Examples include, but are not limited to, American Express, MasterCard, Visa or any other form of electronic payment or transaction system. In this embodiment, when a cardholder uses the payment card 16 of a card vendor which is linked to the consumer number 108 at a participating merchant to pay for a transaction, the rewards associated with that purchase will automatically be applied to the consumer/cardholder's merchant rewards account by the fact that the consumer number 108 is linked in the system 100 to the card vendor card and to the merchant-consumer rewards system 104. In this embodiment, in addition to the consumer rewards platform 102 and the merchant-consumer rewards system 104, the card vendor system 118 has been added as another component in the overall consolidated consumer rewards system 100.

The data stored within the consumer rewards platform 102 is contained in a consumer rewards database 114. This consumer rewards database 114 contains information relating to consumers, merchants, merchant rewards programs, and in the embodiment of FIG. 2, card vendors. Information gets added, deleted, or updated to the consumer rewards database 114 based on the consumer rewards card platform 102 interactions with several data sources including the merchant-consumer rewards system 104, card vendor system(s) 118, and consumer input received through a consumer web portal 110 ("consumer portal 110"). Every participating consumer and merchant is assigned a unique alphanumeric ID and the consumer rewards database 114 maintains a cross-reference relationship or link between the consumer numbers 108 and merchant rewards account numbers to facilitate the trading and linking of data with merchants, as further described.

Figure 3:
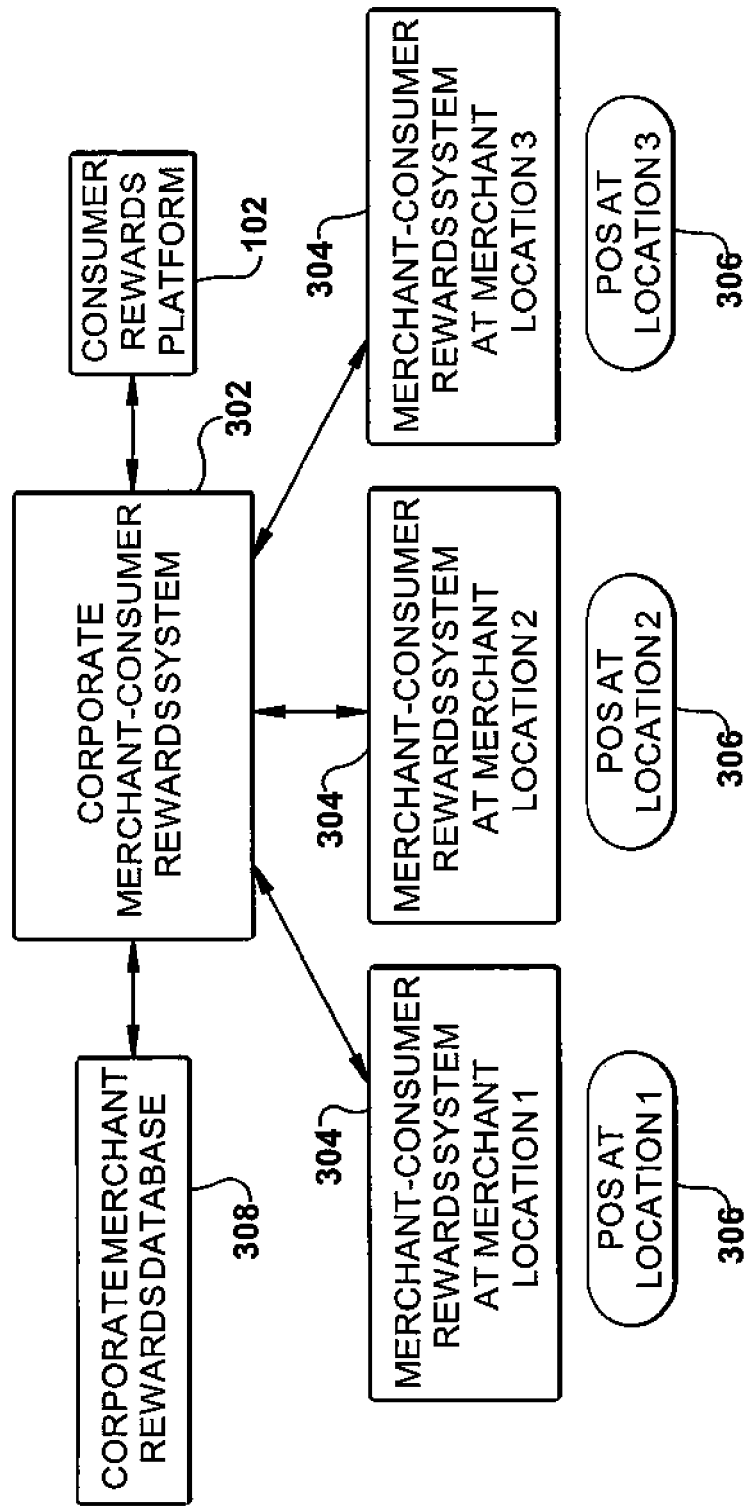
FIG. 3 is a block diagram of a representative consumer rewards platform integration with a corporate merchant-consumer rewards system.

As depicted in FIG. 3, the consumer rewards platform 102 communicates with merchants at the corporate level via the corporate merchant-consumer rewards system 302. The corporate merchant-consumer rewards system 302 contains rewards program logic and master customer data including demographic information, transaction history, and total customer rewards points. This information gets stored in the merchant rewards data database 308. The rewards systems that are located at each merchant location 304 contain a subset of the information contained in the corporate merchant-consumer rewards system 302. The same information is collected but the data residing on the individual merchant-consumer rewards system 304 encompasses only information regarding customers who shop at that particular location. The rewards system at a merchant location 304 and the local POS system 306 work in tandem to collect, store, update, and manage rewards data on a local basis. This information is periodically sent to the corporate merchant-consumer rewards system 302 so that the master information is kept up to date. Similarly, when the consumer rewards platform 102 receives information relating to customer demographic changes or any additions or deletions from the rewards program, the consumer rewards platform 102 relays that information to the corporate merchant-consumer rewards system 302, who in turn sends the information to the appropriate merchant-consumer-rewards system 304.

The corporate merchant-consumer rewards system 302 can also be programmed to handle 'automatic enrollment', which allows consumers to enroll in a merchant rewards program by simply expressing an interest in joining the program and by presenting his/her consumer number 108 to the participating merchant. When the merchant receives and enters the consumer number 108 (for example by entering or scanning the consumer rewards number 108), logic is set up in the merchant rewards database 308 to recognize and credit new consumers using a consumer number that is not immediately recognized at the point of purchase. The merchant-consumer rewards system 302 will accept the purchase and query the consumer rewards platform 102 to match the consumer number 108 with the consumer's demographic information for purchase credit or acknowledgement. This enables sharing of consumer information with all merchants where the consumer conducts business. The merchant rewards/POS system 304, 306, in conjunction with the consumer rewards platform 102, will also have the ability to: complete the checkout process and store the points/money added into the rewards program for a given consumer number (this might include entering or scanning the rewards card number through a barcode reader); join to a rewards program for the first time or by using an existing rewards account number; process a demographic update from the consumer rewards platform; update the consumer rewards platform 102 with rewards account number changes; update the POS system with consumer rewards un-subscription details; update the POS system with a consumer's link details; and update the POS system with a consumer's unlink details.

Figure 4A:
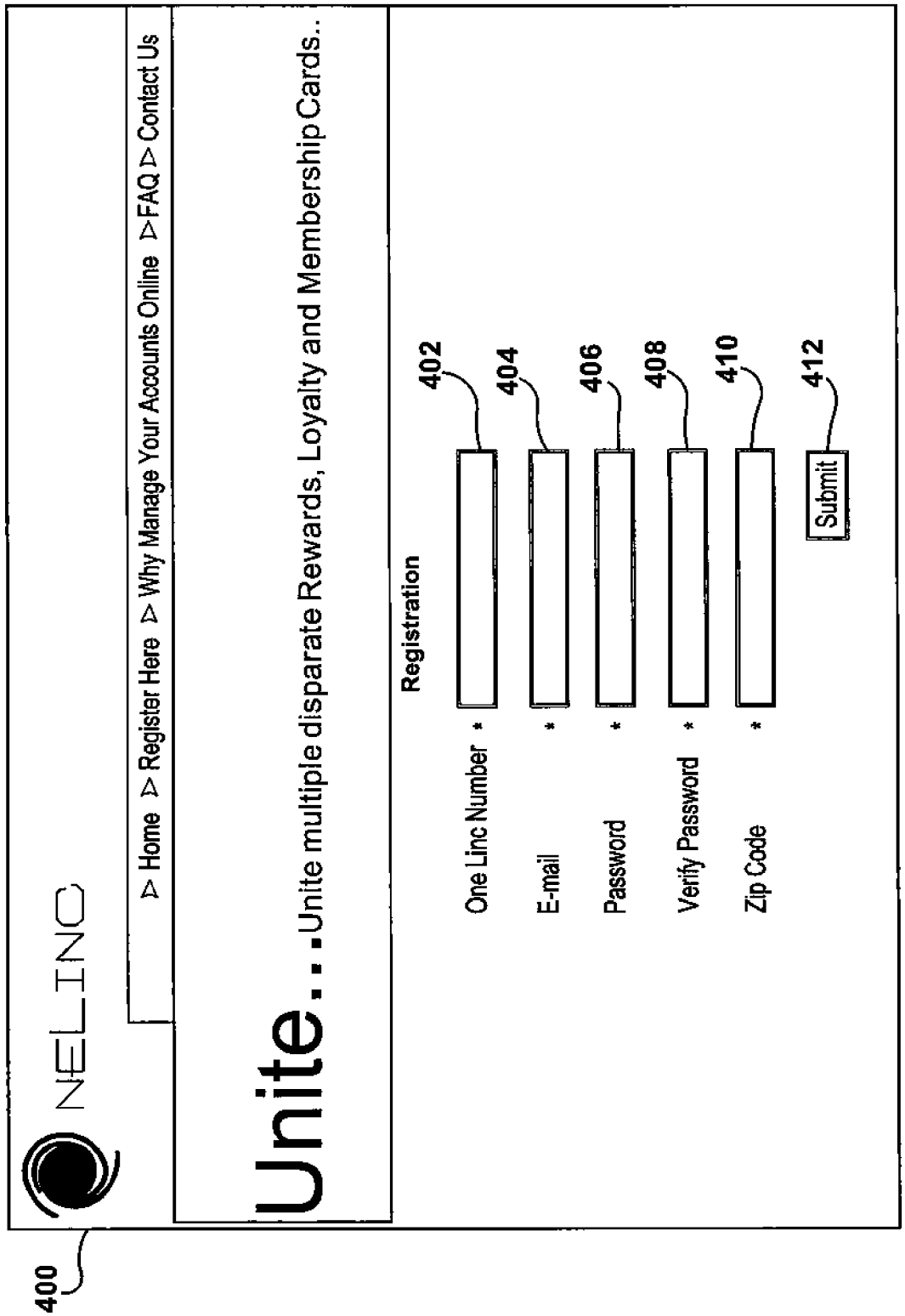
FIGS. 4A-4D illustrate representative user interface screens a consumer would use to interact with the consumer rewards platform via the internet.
Figure 4B:
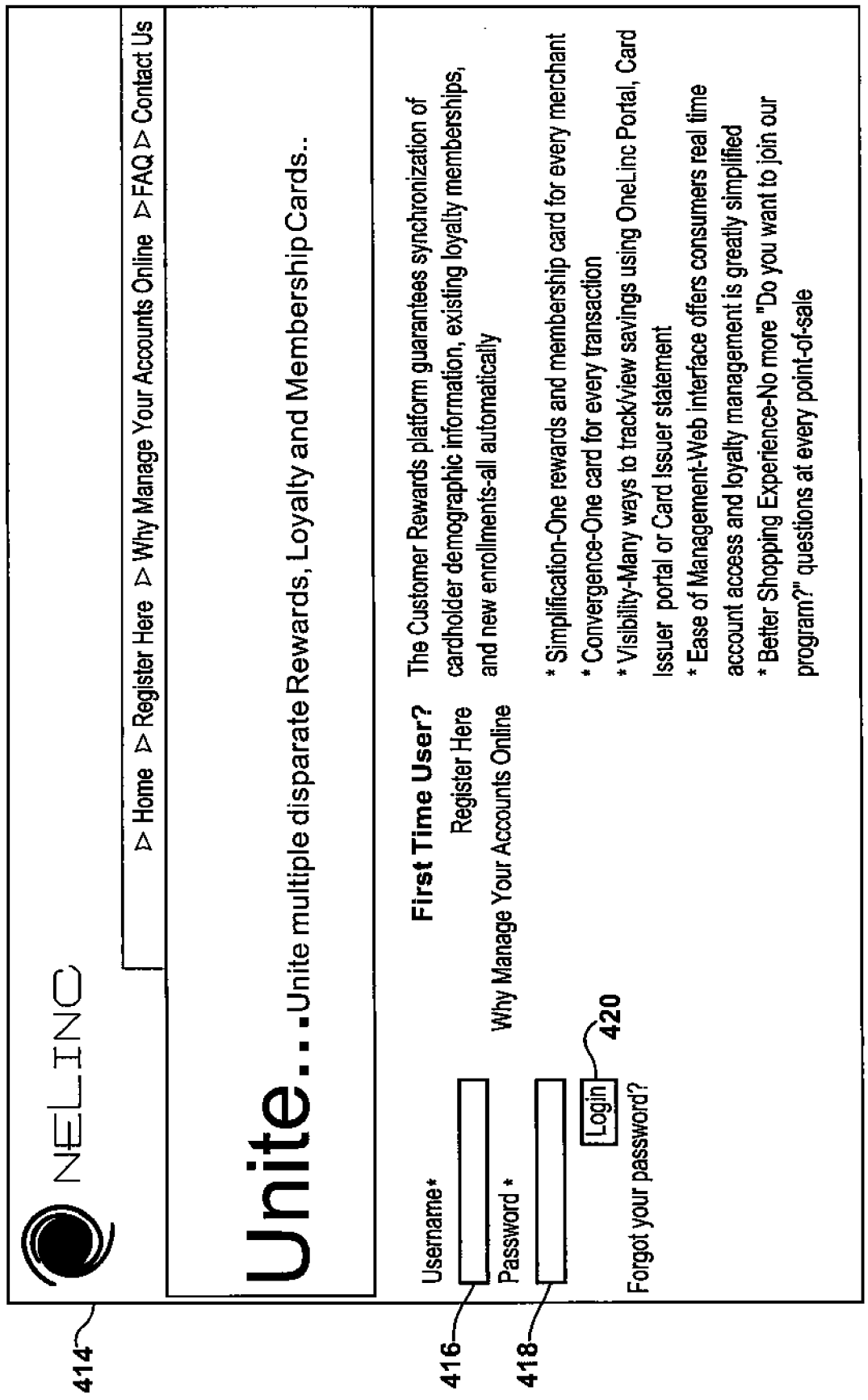

The consumer rewards platform 102 interacts directly with consumers via a consumer web portal ("consumer portal" 110). Representative interfaces and online forms for data entry by a consumer, as may be implemented for example on one or more pages of a website, for interaction with and use of the consumer rewards platform 102 are illustrated in FIGS. 4A-4D. The consumer would first register online to access the website of the consumer rewards platform 102. FIG. 4A gives a representative example of a typical registration screen display or webpage 400. It requires the consumer to enter his or her consumer number in field 402, e-mail address in field 404, choose and verify a password in fields 406 408, and enter a zip code in field 410. When the consumer clicks on the 'submit' button 412, an e-mail is automatically sent to the consumer verifying the request for registration. Once the consumer confirms, he may proceed to the consumer rewards platform home page 414 (FIG. 4B) to login to the website and access the consumer rewards platform 102. Referring to FIG. 4B, the consumer is required to enter his username in field 416 and password in field 418. Once the consumer clicks on the 'login' button 420, the username/password combination are authenticated by the consumer rewards platform 102 and if valid, the user will gain access to the website.

Figure 4C:
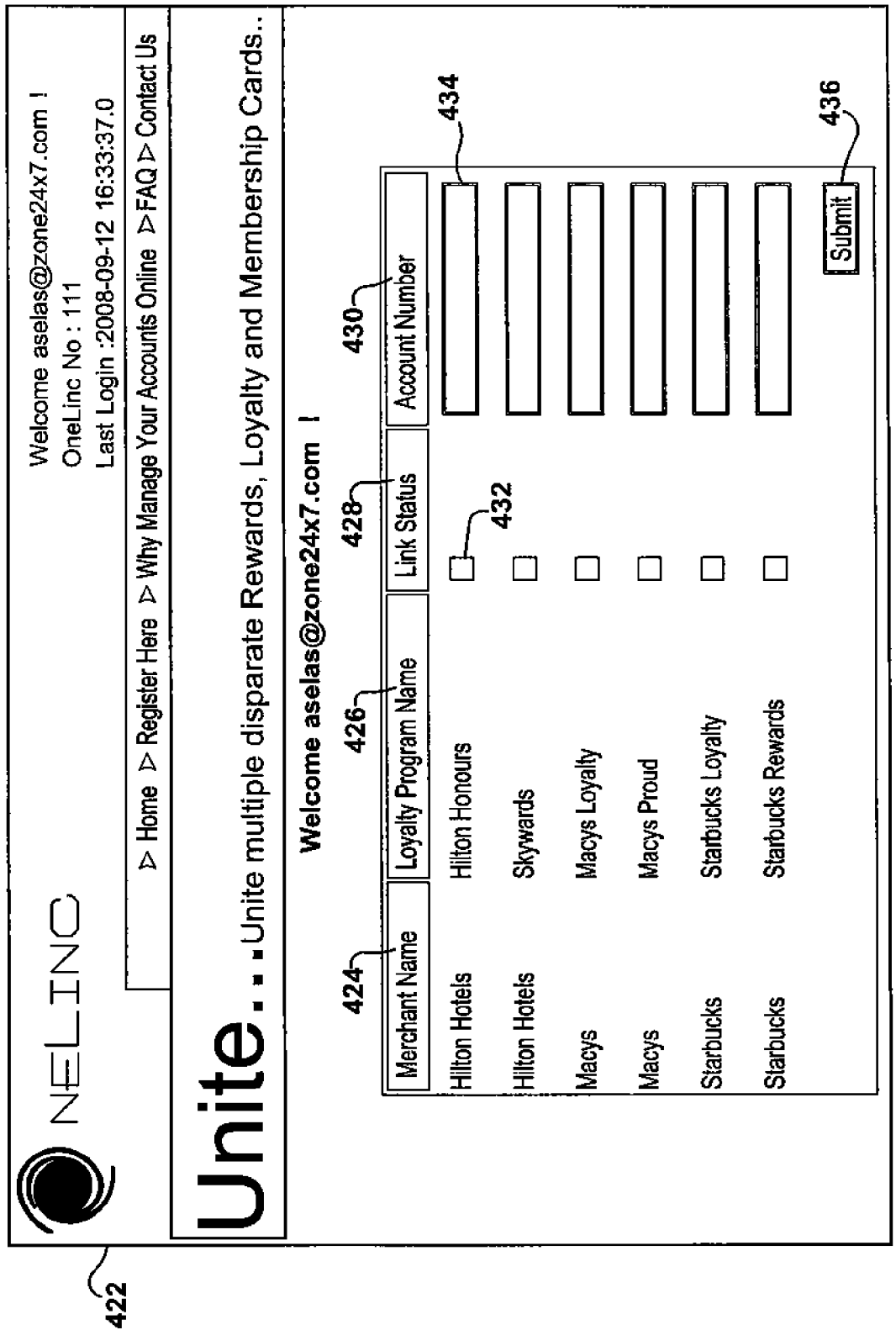

There are several services available on the website to facilitate rewards account management by the consumer. One service provided to the consumer via the consumer web portal 110 is the option to add or delete membership in any particular merchant rewards program. A representative screen presenting this service is shown in FIG. 4C. When the consumer selects this option, the linking/unlinking page for merchant reward programs will appear for example in the form of page 422. This screen display will contain a list of participating merchants in a column or field 424, a corresponding list of merchant rewards program names in column or field 426, a link status list in column or field 428 which may include selectable/de-selectable check boxes, and list of account numbers in column or field 430 corresponding to each merchant program 426, with multiple fields 434 for entry of corresponding account numbers. To add a merchant rewards program, the consumer will simply click on the 'link status' checkbox 432 next to the appropriate merchant program. Any program that the consumer is currently enrolled in will have a check in the link box 432 next to that program. To remove membership in one of the programs, the consumer will click on the checkbox 432 thus toggling the checkbox to an off position at which point it will display an empty checkbox. When the selections and entries are completed, clicking on the 'submit' button 436 sends the information to the consumer rewards platform 102 for processing of rewards points for future transactions in accordance with the input data.

Figure 4D:
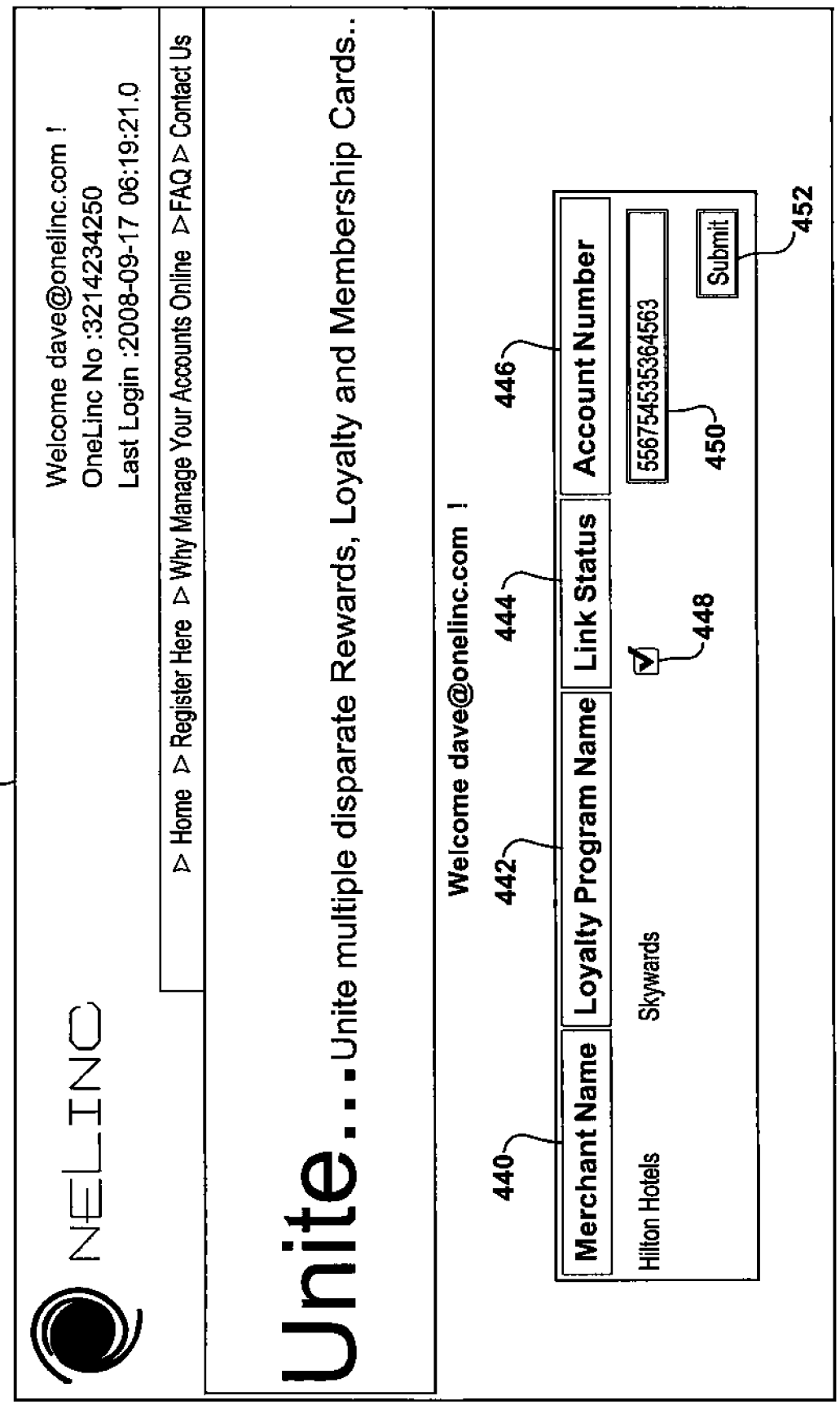

Another service provided to the consumer through the consumer portal 110 is the option to link an existing merchant rewards account to the single, unique consumer number 108. FIG. 4D illustrates a representative user interface screen 438 by which this aspect of the system can be accomplished. Similar to the add/delete membership screen represented by FIG. 4C, the link existing membership screen 438 also displays participating merchants in column or field 440, corresponding rewards programs in column or field 442, link status in column or field 444 and account numbers in column or field 446. To link an existing rewards/rewards account to a consumer number, the consumer will be required to locate the participating merchant from the merchant list in field 440, select the corresponding rewards program name from the list in field 442, click on the link status checkbox in field 448, enter the old rewards account number into the account number dialog box 450, and click the 'submit' button 452. The information will be saved in the consolidated consumer rewards database 114 and the consumer number 108 will be cross-referenced with the old rewards account number.

Figure 5:
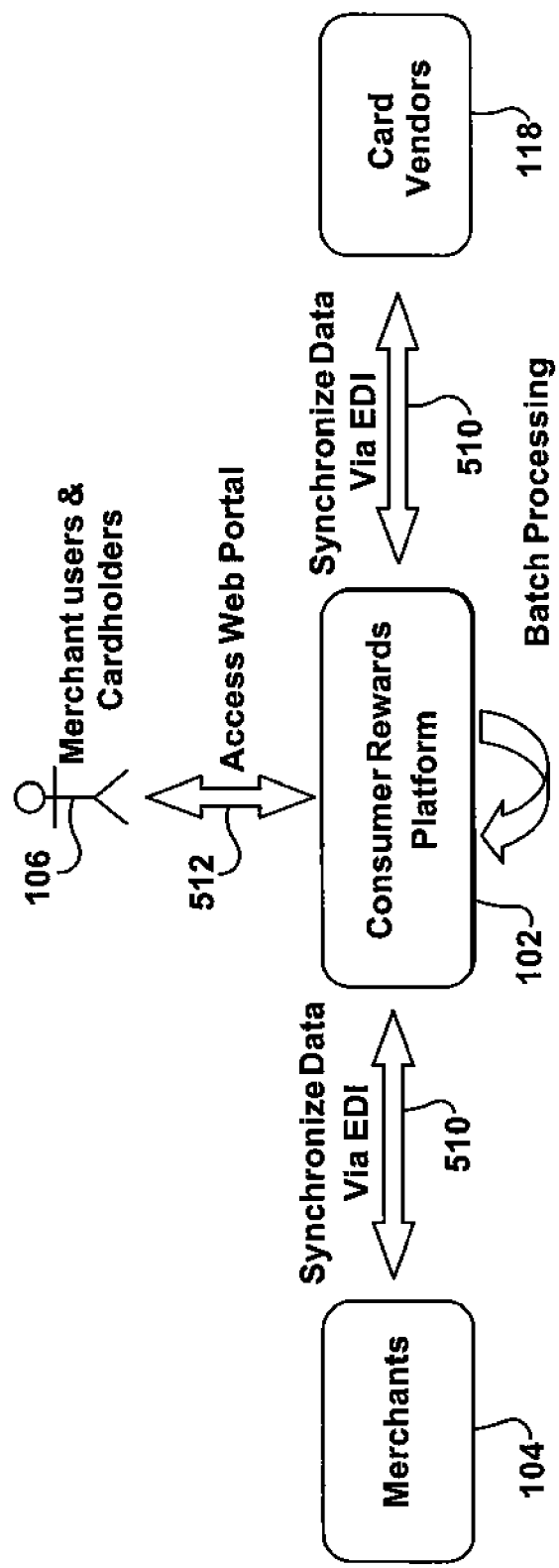
FIG. 5 is a block diagram illustrating a representative method of communication between consumers, merchants, card vendors, and a consumer rewards platform.

In the alternate embodiment of the disclosure wherein the consumer number 108 is associated with a payment card (i.e., any card or payment system administered by a card vendor), the consumer rewards platform 102 serves as middleware for communications between merchants, consumers, and card vendors. The consumer rewards platform 102 receives information directly from each party to the process (consumers, merchants, and card vendors) either through EDI or via the internet or other network, as shown, for example, in FIG. 5. Information sent between the merchant-consumer rewards system 104, card vendor system 118 and the consumer rewards platform 102 can be sent via an asynchronous EDI batch transfer 510. The information being sent between the consumer 106 and the consumer rewards platform 102 is sent over the Internet through the consumer access web portal 512.

Referring back to FIG. 2, the consumer rewards platform 102 makes a number of services available that help to facilitate requests for information between the various parties to the system (these services are additionally described in FIG. 1 for the consumer rewards platform/merchant-consumer rewards system scenario). Information sent between the consumer rewards platform 102 and the merchant-consumer rewards system 104 includes, but is not limited to, as schematically represented by the numbered lines: unsubscribe details 25; consumers that have left the rewards program 24; consumer number change details 23; rewards program number change details 22; link existing rewards account details 21; consumer rewards data updates 20; changed demographic details 19; new consumer subscriptions via consumer portal 18; and new consumer subscriptions via merchant location 17. Information sent between the card vendor system 118 and the consumer rewards platform 102 includes: new consumer details 1; demographic information 2; consumer number change details 3; consumer unsubscribe details 4; requests for consumer reward details 5; and replies with consumer rewards details 31. There is some information which originates at the card vendor 118 but must be received by the merchant, such as a change in consumer demographics 2 or consumer number 3, or a request by a consumer to discontinue his/her consumer number 4. This information does not go directly from the card vendor 118 to the merchant-consumer rewards system 104, but first goes to the consumer rewards platform 102, where the information is updated and then forwarded to the merchant-consumer rewards system 104, for example in the next outbound EDI transmission. For example, when a consumer 106 notifies a card vendor in the card vendor system 118 of a change of address, the card vendor system 118 sends the information to the consumer rewards platform 102 (e.g. via EDI), and the consumer rewards platform 102 updates the consumer information stored in its own database and then sends the information to the appropriate merchant-consumer rewards system 104 (e.g.

via EDI). The card vendor may also report rewards program point details to the consumer via his/her monthly card vendor statement 6.

As mentioned above and as further indicated by FIG. 2, consumers 106 may communicate directly with the consumer rewards platform 102 through the consumer portal 110. Through this portal, the consumer 106 may as schematically represented by the numbered lines: login to the consumer portal 7; link existing rewards accounts 8; register for access 9; join new rewards programs 10; view rewards registrations 11; reset password 12; change profile details 13; remove membership from a rewards program 14; and unsubscribe from the entire program 32. The consumer rewards platform may also communicate with consumers via email, such as when the system sends the consumer email notifications for events 15, such as enrollment, un-enrollment, and number change verification.

Figure 6:
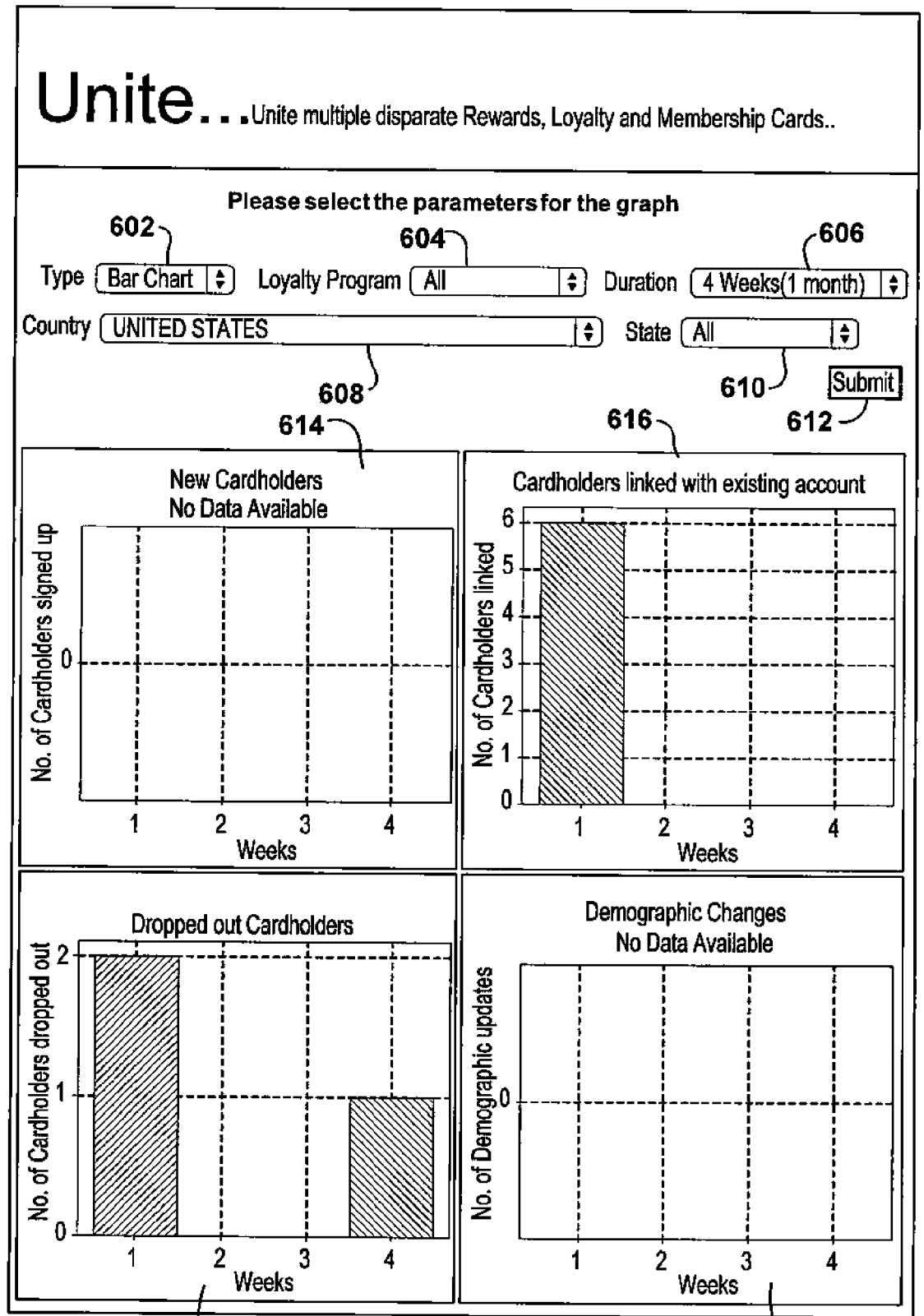
FIG. 6 illustrates representative merchant metrics displayed through a web-based user interface.

In addition to the consumer portal 110, the consumer rewards platform 102 also provides a merchant portal 112. Through this website or other graphical user interface, merchants can, as represented by the numbered lines, login with multiple user accounts 30 and view rewards program metrics such as: the number of demographic updates that have processed for a given time period 29; the number of consumers who have dropped out of the rewards program 28; the number of consumers who successfully joined the rewards program 27; and the number of new consumers for a specific period of time 26. To access the website, the merchant will first be required to login to the system by entering a username and password. FIG. 6 illustrates a representative display of information provided to merchants via the merchant web portal. The metrics screen displays graphical representations of rewards program participation. The merchant can set the parameters of the display by selecting the type of display (bar chart, pie chart, etc.) 602, the rewards program 604, the duration of time that the data will represent 606, and the participating country 608 and state 610. After clicking on the 'submit' button 612, the requested charts will be generated and displayed on the screen. As represented in FIG. 6, a bar chart is used to represent the number of new consumers 614, the number of consumers linked with an existing account 616, the number of consumers who have dropped out of the program 618, and the number of demographic changes 620. The system can be configured to provide other detailed data to merchants on program activity and participation.

The foregoing describes in detail consolidated consumer rewards systems and methods by which the loyalty or rewards or membership programs of multiple merchants can be accessed and used by a consumer with a single transaction vehicle. Consumer enrollment in a program is completely automated. Integration of consolidated rewards accounting with payment systems such as credit cards enables the payment instrument to trigger the corresponding consumer reward for a purchase in a merchant's reward program. The systems and methods can accommodate multiple merchants with multiple different types of rewards and loyalty programs, and administer changes to the programs. Consumers can access and use the system via the internet, to enroll, to select or de-select merchants for program participation, change their profile information, and browse program information. Merchants can also access and use the system via the internet, to change the rules or terms of their programs, and to monitor consumer activity, usage and effectiveness of their programs.

The invention claimed is:

1. A consolidated consumer rewards system comprising:
a combination of hardware, software and communications devices operative to administer multiple consumer rewards programs of multiple merchants, the combination of hardware, software and communications devices comprising:
a consumer rewards platform configured and programmed to maintain multiple unique consumer numbers which are used to automatically enroll multiple consumers in multiple consumer rewards programs of multiple merchants at a point of purchase of each merchant, and to account for purchasing activity which affects any of the multiple consumer rewards programs;
the consumer rewards platform operatively connected to multiple consumer rewards programs, the consumer rewards programs having content which defines criteria for enrolling and rewarding consumers for purchases and maintaining records of demographic information, consumer purchasing and transaction history and awards activity;
the consumer rewards platform configured to assign a unique consumer number to each consumer and to automatically enroll each consumer in a consumer rewards program at a point of sale of a merchant by reference to a unique consumer number, the unique consumer number used by the consolidated consumer rewards platform to track enrollment and purchasing activity of a consumer for processing by the consolidated consumer rewards platform;
the consolidated consumer rewards platform further configured to automatically enroll multiple consumers in multiple consumer rewards programs at a merchant point of sale by reference to a unique consumer number in the consolidated consumer rewards platform and to match rewards from each of the consumer rewards programs of each of the multiple merchants to each enrolled consumer by transfer of information on consumer activity from the multiple merchant consumer rewards programs to the consolidated consumer rewards platform, the information on consumer activity being referenced to the corresponding unique consumer numbers for the consumer activity, whereby data content of the consolidated consumer rewards platform is altered by the consumer activity information received from the multiple merchant-consumer rewards platforms and can be accessed by the use of the unique consumer numbers; and
the consolidated consumer rewards platform further configured to update consumer demographic information in the consolidated consumer rewards platform and to automatically provide updated consumer demographic information to each merchant consumer rewards program connected to the consolidated consumer rewards platform.

2. The consolidated consumer rewards system of claim 1, wherein the consolidated consumer rewards platform includes a consolidated consumer rewards database which contains unique consumer numbers and records for each unique consumer number pertaining to each consumer rewards program.

3. The consolidated consumer rewards system of claim 1, wherein the consumer rewards platform is configured to be accessed by consumers via a consumer portal network connection whereby a consumer can input information pertaining to consumer rewards programs.

4. The consolidated consumer rewards system of claim 1, wherein the consumer rewards platform is configured to be accessed by merchants via a merchant portal network connection whereby a merchant can access and input information pertaining to consumer rewards programs.

5. The consolidated consumer rewards system of claim 3, wherein the consumer portal is in the form of a website with one or more web pages which present to a consumer information on multiple consumer rewards programs.

6. The consolidated consumer rewards system of claim 4, wherein the merchant portal is in the form of a website with one or more pages which present to a merchant information on enrollment and purchasing activity of consumers enrolled in the merchant's consumer rewards program.

7. The consolidated consumer rewards system of claim 5, wherein the consumer portal is configured to interact with the consolidated consumer rewards platform to enable and perform any of the functions selected form the group of: enrolling in the consumer rewards system and acquiring a unique consumer number for use with and by the consumer rewards program; enrolling in one or more consumer rewards programs; viewing information pertaining to one or more consumer rewards programs; establishing links between two or more consumer rewards programs; inputting or editing consumer demographic information; un-enrolling form a consumer rewards program; receiving a message from a consumer rewards program.

8. The consolidated consumer rewards system of claim 1, wherein the merchant portal is configured to interact with the consolidated consumer rewards platform to enable access to information on consumers enrolled in a merchant's consumer reward program through the consolidated consumer rewards platform.

9. The consolidated consumer rewards system of claim 8, wherein information on consumers enrolled in a merchant's consumer rewards program is accessed via the merchant portal to the consolidated consumer rewards platform by use of unique consumer numbers.

10. The consolidated consumer rewards system of claim 1, wherein the consolidated consumer rewards platform is operatively connected to a merchant's consumer reward program to send data to the consumer reward program, the data selected from the group of: information from the consolidated consumer rewards platform on consumers enrolled or un-enrolled in a merchant's consumer rewards program through the consolidated consumer rewards platform, including unique consumer numbers assigned by the consumer rewards platform; new information pertaining to consumers previously enrolled in a merchant's consumer rewards program; links between two or more consumers enrolled in the consolidated consumer rewards platform; whereby data content of the merchant-consumer rewards program is altered by the data received from the consolidated consumer rewards platform.

11. The consolidated consumer rewards system of claim 1, wherein the consolidated consumer rewards platform is operatively connected to multiple merchant consumer rewards programs to receive data form the merchant-consumer rewards programs selected form the group of: enrollment by a consumer in a merchant's consumer reward program; information pertaining to consumers already enrolled in a merchant's consumer rewards program; information pertaining to a merchant's consumer rewards program; information pertaining to consumer transactions with a merchant which affect consumer rewards from a merchant's consumer rewards program for a unique consumer number, whereby data content of the consolidated consumer rewards platform is altered by the data received from the merchant consumer rewards program.

12. The consolidated consumer rewards system of claim 1, wherein the unique consumer number is in the form of data on a device which is used as a data transfer device in connection with a consumer transaction with a merchant.

13. A consolidated consumer rewards system comprising:
a combination of hardware, software and communications devices operative with multiple consumer reward programs of multiple merchants, the combination of hardware software and communications devices comprising:
a consolidated consumer rewards platform operatively connected to multiple merchant-consumer rewards programs, the merchant-consumer rewards programs having content which defines criteria for enrolling and rewarding consumers for purchases and maintaining records of consumer demographics and awards activity;
the consolidated consumer rewards platform configured to assign a unique consumer number to each consumer to automatically enroll consumers in one or more merchant-consumer rewards programs at a merchant point of sale by reference to the unique consumer number in the consolidated consumer rewards platform; and
the consolidated consumer rewards platform further configured to update consumer demographic information in the consolidated consumer rewards platform and to automatically provide updated consumer demographic information to each merchant-consumer rewards program connected to the consolidated consumer rewards platform.

14. The consolidated consumer rewards system of claim 13, wherein the consolidated consumer rewards platform includes a consumer rewards database which contains unique consumer numbers and records for each unique consumer number pertaining to each consumer rewards program.

15. The consolidated consumer rewards system of claim 13, wherein the consolidated consumer rewards platform is configured to be accessed by consumers via a consumer portal network connection whereby a consumer can input information pertaining to consumer rewards programs.

16. The consolidated consumer rewards system of claim 13, wherein the consolidated consumer rewards platform is configured to be accessed by merchants via a merchant portal network connection whereby a merchant can access and input information pertaining to a merchant-consumer rewards programs.

17. The consolidated consumer rewards system of claim 13, wherein the consolidated consumer rewards platform is configured and operative to automatically enroll consumers in consumer rewards programs by linking the unique consumer number of a consumer to a merchant-consumer reward program of a merchant selected by the consumer.

18. The consolidated consumer rewards system of claim 15, wherein the consumer portal is in the form of a website with one or more web pages which present to a consumer information on multiple merchant-consumer rewards programs.

19. The consolidated consumer rewards system of claim 16, wherein the merchant portal is in the form of a website with one or more pages which present to a merchant information on consumer demographics, enrollment or purchasing activity of consumers enrolled in the merchant's consumer rewards program.

20. The consolidated consumer rewards system of claim 18, wherein the consumer portal is configured to interact with the consolidated consumer rewards platform to enable and perform any of the functions selected from the group of: acquiring a unique consumer number for use with and by the merchant-consumer rewards program; enrolling in one or more merchant-consumer rewards programs; viewing information pertaining to one or more consumer rewards programs; establishing links between two or more merchant-consumer rewards programs; inputting or editing consumer demographic information; un-enrolling from a merchant-consumer rewards program; receiving a message from a merchant-consumer rewards program.

21. The consolidated consumer rewards system of claim 13, wherein the merchant portal is configured to interact with the consolidated consumer rewards platform to enable access to information on consumers enrolled in a merchant's merchant-consumer reward program through the consolidated consumer rewards platform.

22. The consolidated consumer rewards system of claim 21, wherein information on consumers enrolled in a merchant's merchant-consumer rewards program is accessed via the merchant portal to the consolidated consumer rewards platform by use of the unique consumer numbers.

23. The consolidated consumer rewards system of claim 13, wherein the consolidated consumer rewards platform is operatively connected to a merchant's consumer reward program to send data to the merchant-consumer reward program, the data selected form the group of: information form the consolidated consumer rewards platform on consumers enrolled or un-enrolled in a merchant's merchant-consumer rewards program through the consolidated consumer rewards platform, including unique consumer numbers assigned by the consolidated consumer rewards platform; new information pertaining to consumers previously enrolled in a merchant's merchant-consumer rewards program; links between two or more consumers enrolled in the consolidated consumer rewards platform; whereby data content of a merchant-consumer rewards program is altered by the data received from the consolidated consumer rewards platform.

24. The consolidated consumer rewards system of claim 17, wherein the unique consumer number is in the form of data on a device which is used as a data transfer device in connection with a consumer transaction with a merchant.

* * * * *